US012614434B2

(12) United States Patent
Wedig et al.

(10) Patent No.: US 12,614,434 B2
(45) Date of Patent: Apr. 28, 2026

(54) EVACUATION SYSTEM

(71) Applicant: OneEvent Technologies, Inc., Mount Horeb, WI (US)

(72) Inventors: Kurt Joseph Wedig, Mount Horeb, WI (US); Daniel Ralph Parent, Mount Horeb, WI (US); Tammy Michelle Wedig, Mount Horeb, WI (US); Kristin Ann Sutter-Parent, Mount Horeb, WI (US)

(73) Assignee: OneEvent Technologies, Inc., Eau Claire, WI (US)

( * ) Notice: Subject to any disclaimer, the term of this patent is extended or adjusted under 35 U.S.C. 154(b) by 201 days.

(21) Appl. No.: 18/529,326

(22) Filed: Dec. 5, 2023

(65) Prior Publication Data

US 2024/0203220 A1 Jun. 20, 2024

Related U.S. Application Data

(63) Continuation of application No. 17/858,516, filed on Jul. 6, 2022, now Pat. No. 11,869,343, which is a (Continued)

(51) Int. Cl.
*G08B 7/06* (2006.01)
*G08B 17/06* (2006.01)
(Continued)

(52) U.S. Cl.
CPC ............. *G08B 7/066* (2013.01); *G08B 17/06* (2013.01); *G08B 17/10* (2013.01); *G08B 21/02* (2013.01);
(Continued)

(58) Field of Classification Search
CPC .. G08B 21/02; G08B 21/0423; G08B 21/022; G08B 7/006; G08B 7/066; G08B 25/016;
(Continued)

(56) References Cited

U.S. PATENT DOCUMENTS 6,150,943 A 11/2000 Lehman et al.
7,579,945 B1 * 8/2009 Richter .................. G08B 25/14 340/506
(Continued)

FOREIGN PATENT DOCUMENTS

EP 119837 2/2004
WO 95/19202 A1 7/1995
(Continued)

OTHER PUBLICATIONS

Development of Infrared Human Sensor from the Matsushita Electric Works (MEW) Sustainability Report, 2004.
(Continued)

*Primary Examiner* — Hoi C Lau
(74) *Attorney, Agent, or Firm* — Kenneth A. Smith

(57) ABSTRACT

A system includes a first sensor configured to identify information regarding an emergency condition associated with a structure and a second sensor configured to identify an occupancy pattern regarding the structure. The system also includes a processor operatively coupled to the first sensor, the second sensor, and a transceiver. The processor is configured to determine a severity of the emergency condition based at least in part on the information regarding the emergency condition and prioritize rescues within the structure based at least in part on the occupancy pattern. The system also includes the transceiver which is configured to transmit an identification of the emergency condition, a location of the structure, the occupancy pattern, the prioritization of rescues, and the severity of the emergency condition.

20 Claims, 3 Drawing Sheets

Related U.S. Application Data continuation of application No. 17/104,649, filed on Nov. 25, 2020, now Pat. No. 11,393,305, which is a continuation of application No. 16/723,726, filed on Dec. 20, 2019, now abandoned, which is a continuation of application No. 16/042,548, filed on Jul. 23, 2018, now Pat. No. 10,529,199, which is a continuation of application No. 15/494,185, filed on Apr. 21, 2017, now Pat. No. 10,032,348, which is a continuation of application No. 14/940,969, filed on Nov. 13, 2015, now Pat. No. 9,633,550, which is a continuation of application No. 14/734,304, filed on Jun. 9, 2015, now Pat. No. 9,189,939, which is a continuation of application No. 14/283,532, filed on May 21, 2014, now Pat. No. 9,129,498, which is a continuation of application No. 12/346,362, filed on Dec. 30, 2008, now Pat. No. 8,749,392.

(51) Int. Cl.

*G08B 17/10* (2006.01)
*G08B 21/02* (2006.01)
*G08B 25/00* (2006.01)
*G08B 25/08* (2006.01)
*G08B 29/18* (2006.01)

(52) U.S. Cl.

CPC ........... *G08B 25/00* (2013.01); *G08B 25/004* (2013.01); *G08B 25/006* (2013.01); *G08B 25/009* (2013.01); *G08B 25/085* (2013.01); *G08B 29/181* (2013.01)

(58) Field of Classification Search

CPC .... G08B 25/00; G08B 25/004; G08B 25/006; G08B 25/009; G08B 25/085; G08B 17/00; G08B 17/06; G08B 17/10

See application file for complete search history.

(56) References Cited

U.S. PATENT DOCUMENTS 8,044,772 B1 10/2011 Roe
8,253,553 B2 * 8/2012 Wedig .................... G08B 7/066 340/541
8,749,392 B2 * 6/2014 Wedig .................... G08B 17/06 340/539.18
8,970,365 B2 * 3/2015 Wedig ................ G08B 21/0423 340/539.18
9,129,498 B2 * 9/2015 Wedig .................. G08B 25/085
9,189,939 B2 * 11/2015 Wedig .................. G08B 29/181
9,609,594 B2 * 3/2017 Snyder ............. H04W 52/0216
9,633,550 B2 * 4/2017 Wedig .................... G08B 17/06
9,666,042 B2 * 5/2017 Wedig .................. G08B 17/103
9,679,255 B1 * 6/2017 Mullaly ............... G08B 29/188
9,679,449 B2 * 6/2017 Wedig .................... G08B 19/00
9,799,205 B2 * 10/2017 Wedig .................... G08B 25/10
9,990,818 B2 * 6/2018 Wedig .................... G08B 7/066
10,032,348 B2 * 7/2018 Wedig .................... G08B 17/06
10,192,411 B2 * 1/2019 Wedig .................. G08B 25/007
10,244,474 B2 * 3/2019 Snyder ............. H04W 52/0216
10,529,199 B2 * 1/2020 Wedig .................. G08B 25/006
10,540,871 B2 * 1/2020 Wedig ................... H04W 4/024
10,600,292 B2 * 3/2020 Wedig .................... G08B 17/06
10,657,797 B2 * 5/2020 Wedig .................... G08B 7/066
10,665,069 B2 * 5/2020 Wedig .................... G08B 7/066
10,769,903 B2 * 9/2020 Wedig .................. G08B 27/001
10,769,904 B2 * 9/2020 Wedig .................. G08B 27/001
10,777,052 B2 * 9/2020 Wedig .................... G08B 25/08
10,849,067 B2 * 11/2020 Snyder ............. H04W 52/0216
11,055,973 B2 * 7/2021 Wedig .................... G08B 7/066
11,145,173 B2 * 10/2021 Wedig .................. G08B 25/007
11,157,825 B2 * 10/2021 Mullaly ............... G08B 29/186
11,238,710 B2 * 2/2022 Wedig .................... G08B 31/00
11,393,305 B2 * 7/2022 Wedig .................. G08B 25/085
11,395,227 B2 * 7/2022 Snyder ............. H04W 52/0216
11,869,343 B2 * 1/2024 Wedig .................. G08B 25/009
11,893,880 B2 * 2/2024 Wedig .................... G08B 17/06
11,924,756 B2 * 3/2024 Snyder ............. H04W 52/0216
11,948,450 B2 * 4/2024 Kronz .................... G08B 21/12
11,995,976 B2 * 5/2024 Wedig .................... G08B 25/10
12,302,243 B2 * 5/2025 Snyder ............. H04W 52/0216
12,322,278 B2 * 6/2025 Wedig .................. G06Q 90/205
12,346,837 B2 * 7/2025 Mullaly ................. G08B 17/10
2005/0190053 A1 * 9/2005 Dione .................... G08B 21/22 340/500
2010/0148672 A1 * 6/2010 Hopper ................ H05B 47/105 315/158
2010/0164713 A1 * 7/2010 Wedig .................... G08B 7/066 340/539.13
2010/0164732 A1 * 7/2010 Wedig .................... G08B 17/10 340/577
2011/0241877 A1 * 10/2011 Wedig .................... G08B 17/00 340/540
2014/0167969 A1 * 6/2014 Wedig .................... G08B 7/066 340/584
2014/0191875 A1 * 7/2014 Wedig .................. G08B 17/103 340/628
2014/0253317 A1 * 9/2014 Wedig .................. G08B 25/006 340/521
2014/0269477 A1 * 9/2014 Snyder ............. H04W 52/0216 370/311
2015/0015401 A1 * 1/2015 Wedig .................... G08B 25/08 340/577
2015/0137967 A1 * 5/2015 Wedig .................... G08B 17/10 340/501
2015/0170503 A1 * 6/2015 Wedig .................... G08B 7/066 340/691.5
2015/0269822 A1 * 9/2015 Wedig .................. G08B 25/009 340/524
2016/0071401 A1 * 3/2016 Wedig .................. G08B 25/009 340/522
2017/0221326 A1 * 8/2017 Wedig .................... G08B 17/06
2017/0330431 A1 * 11/2017 Wedig .................... G08B 21/22
2017/0337485 A1 * 11/2017 Mullaly ............... G08B 29/188
2017/0359781 A1 * 12/2017 Snyder ............. H04W 52/0216
2017/0372568 A1 * 12/2017 Wedig .................... G08B 15/00
2018/0040232 A1 * 2/2018 Wedig .................... G08B 17/10
2019/0066463 A1 * 2/2019 Wedig .................... G08B 17/06
2019/0066464 A1 * 2/2019 Wedig .................... G08B 29/26
2019/0114881 A1 * 4/2019 Wedig .................. G08B 25/085
2019/0221089 A1 * 7/2019 Wedig .................... G08B 7/066
2019/0223099 A1 * 7/2019 Snyder ............. H04W 52/0216
2020/0005609 A1 * 1/2020 Murhty ................ H05B 47/175
2020/0082682 A1 * 3/2020 Wedig ....................... G07C 9/00
2020/0082683 A1 * 3/2020 Wedig ............. G08B 13/19684
2020/0082684 A1 * 3/2020 Wedig .................... G08B 29/26
2020/0134992 A1 * 4/2020 Wedig .................. G08B 25/009
2020/0327785 A1 * 10/2020 Wedig .................... G08B 21/22
2020/0394880 A1 * 12/2020 Wedig ................... H04W 4/024
2020/0410828 A1 * 12/2020 Wedig .................... G08B 7/066
2020/0410844 A1 * 12/2020 Wedig .................. G01C 21/206
2021/0104137 A1 * 4/2021 Wedig .................. G08B 25/009
2021/0112494 A1 * 4/2021 Snyder ............. H04W 52/0216
2021/0335107 A1 * 10/2021 Wedig .................... G08B 21/22
2022/0005142 A1 * 1/2022 Mrozek ................ G06Q 90/205
2022/0044140 A1 * 2/2022 Mullaly ................... G06N 7/01
2022/0172585 A1 * 6/2022 Wedig .................. G08B 27/001
2022/0230528 A1 * 7/2022 Wedig .................. G08B 25/016
2022/0406154 A1 * 12/2022 Wedig .................... G08B 21/02
2023/0021538 A1 * 1/2023 Snyder ............. H04W 52/0216
2024/0083455 A1 * 3/2024 Kume .................... B60K 35/80
2024/0194041 A1 * 6/2024 Wedig .................. G08B 17/103
2024/0203220 A1 * 6/2024 Wedig .................. G08B 25/085
2024/0334325 A1 * 10/2024 Snyder ............. H04W 52/0216
2024/0346915 A1 * 10/2024 Wedig .................. G01C 21/206

(56) References Cited

U.S. PATENT DOCUMENTS

FOREIGN PATENT DOCUMENTS

| | | |
|---|---|---|
| WO | 00/21053 | 4/2000 |
| WO | 2006/034246 | 3/2006 |

OTHER PUBLICATIONS

"Occupancy Sensor Product Guide", from Lutron Electronics Co., Inc., Apr. 2006.

"Portable Carbon Dioxide Human Occupancy Detector" from catalog of ELP GmbH European Logistics Partners, Nov. 2007.

J. Mitchell, "Picking Up the Scent", Tufts Journal, Aug. 2008, Medford, Massachusetts.

S. Pu, et al., "Evacuation Route Calculation of Inner Buildings", Geo-Information for Disaster Management, 2005, Springer Verlag, Heidelberg, pp. 1143-1161; Netherlands.

Velasco, et al., "Safety.net", Stevens Institute of Technology; May 2006; Hoboken, New Jersey.

* cited by examiner

EVACUATION SYSTEM

CROSS-REFERENCE TO RELATED APPLICATIONS

The present application is a continuation of U.S. patent application Ser. No. 17/858,516, filed Jul. 6, 2022, which is allowed but not yet issued, which is a continuation of U.S. patent application Ser. No. 17/104,649, filed Nov. 25, 2020, now U.S. Pat. No. 11,393,305, issued Jul. 19, 2022, which is a continuation of U.S. patent application Ser. No. 16/723,726, filed Dec. 20, 2019, now abandon, which is a continuation of U.S. patent application Ser. No. 16/042,548, filed Jul. 23, 2018, now U.S. Pat. No. 10,529,199, issued Jan. 7, 2020, which is a continuation of U.S. patent application Ser. No. 15/494,185, filed Apr. 21, 2017, now U.S. Pat. No. 10,032,348, issued Jul. 24, 2018, which is a continuation of U.S. patent application Ser. No. 14/940,969, filed Nov. 13, 2015, now U.S. Pat. No. 9,633,550, issued Apr. 25, 2017, which is a continuation of U.S. patent application Ser. No. 14/734,304, filed Jun. 9, 2015, now U.S. Pat. No. 9,189,939, issued Nov. 17, 2015, which is a continuation of U.S. patent application Ser. No. 14/283,532, filed May 21, 2014, now U.S. Pat. No. 9,129,498, issued Sep. 8, 2015, which is a continuation of U.S. patent application Ser. No. 12/346,362 filed Dec. 30, 2008, now U.S. Pat. No. 8,749,392, issued Jun. 10, 2014, the entire disclosures of which are hereby incorporated by reference herein.

BACKGROUND

Most homes, office buildings, stores, etc. are equipped with one or more smoke detectors. In the event of a fire, the smoke detectors are configured to detect smoke and sound an alarm. The alarm, which is generally a series of loud beeps or buzzes, is intended to alert individuals of the fire such that the individuals can evacuate the building. Unfortunately, with the use of smoke detectors, there are still many casualties every year caused by building fires and other hazardous conditions. Confusion in the face of an emergency, poor visibility, unfamiliarity with the building, etc. can all contribute to the inability of individuals to effectively evacuate a building. Further, in a smoke detector equipped building with multiple exits, individuals have no way of knowing which exit is safest in the event of a fire or other evacuation condition. As such, the inventors have perceived an intelligent evacuation system to help individuals successfully evacuate a building in the event of an evacuation condition.

SUMMARY

An exemplary method includes receiving occupancy information from a node located in an area of a structure, where the occupancy information includes a number of individuals located in the area. An indication of an evacuation condition is received from the node. One or more evacuation routes are determined based at least in part on the occupancy information. An instruction is provided to the node to convey at least one of the one or more evacuation routes.

An exemplary node includes a transceiver and a processor operatively coupled to the transceiver. The transceiver is configured to receive occupancy information from a second node located in an area of a structure. The transceiver is also configured to receive an indication of an evacuation condition from the second node. The processor is configured to determine an evacuation route based at least in part on the occupancy information. The processor is further configured to cause the transceiver to provide an instruction to the second node to convey the evacuation route.

An exemplary system includes a first node and a second node. The first node includes a first processor, a first sensor operatively coupled to the first processor, a first occupancy unit operatively coupled to the first processor, a first transceiver operatively coupled to the first processor, and a first warning unit operatively coupled to the processor. The first sensor is configured to detect an evacuation condition. The first occupancy unit is configured to determine occupancy information. The first transceiver is configured to transmit an indication of the evacuation condition and the occupancy information to the second node. The second node includes a second transceiver and a second processor operatively coupled to the second transceiver. The second transceiver is configured to receive the indication of the evacuation condition and the occupancy information from the first node. The second processor is configured to determine one or more evacuation routes based at least in part on the occupancy information. The second processor is also configured to cause the second transceiver to provide an instruction to the first node to convey at least one of the one or more evacuation routes through the first warning unit.

Another illustrative method includes receiving, at a node located in a structure, an indication of an evacuation condition. The structure includes a plurality of nodes in communication with one another. The method also includes sending, by the node, a message to one or more additional nodes. The message informs the one or more additional nodes that the node is going to determine an evacuation route in response to the indication of the evacuation condition such that the one or more additional nodes do not determine the evacuation route. The method also includes determining, by the node, the evacuation route based at least in part on the indication of the evacuation condition and at least in part on a layout of the structure. The method further includes providing, by the node, the evacuation route to the one or more additional nodes.

Another illustrative node includes a memory and a processor operatively coupled to the memory. The memory is configured to store a layout of a structure in which the node is located. The processor is configured to process an indication of an evacuation condition for the structure, where the structure includes a plurality of nodes in communication with one another. The processor is also configured to generate a message to be sent to one or more additional nodes. The message informs the one or more additional nodes that the node is going to determine an evacuation route in response to the indication of the evacuation condition such that the one or more additional nodes do not determine the evacuation route. The processor is also configured to determine the evacuation route based at least in part on the indication of the evacuation condition and at least in part on the layout of the structure. The processor is further configured to cause the evacuation route to be provided to the one or more additional nodes.

Another illustrative non-transitory computer-readable medium includes instructions stored thereon for execution by a processor of a node. The instructions include instructions to receive an indication of an evacuation condition for a structure, where the node is located in the structure, and where the structure includes a plurality of nodes in communication with one another. The instructions also include instructions to send a message to one or more additional nodes. The message informs the one or more additional nodes that the node is going to determine an evacuation route in response to the indication of the evacuation condition such that the one or more additional nodes do not determine the evacuation route. The instructions also include instructions to determine the evacuation route based at least in part on the indication of the evacuation condition and at least in part on a layout of the structure. The instructions further include instructions to provide the evacuation route to the one or more additional nodes.

Other principal features and advantages will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings.

DETAILED DESCRIPTION

Described herein are illustrative evacuation systems for use in assisting individuals with evacuation from a structure during an evacuation condition. An illustrative evacuation system can include one or more sensory nodes configured to detect and/or monitor occupancy and to detect the evacuation condition. Based on the type of evacuation condition, the magnitude (or severity) of the evacuation condition, the location of the sensory node which detected the evacuation condition, the occupancy information, and/or other factors, the evacuation system can determine one or more evacuation routes such that individuals are able to safely evacuate the structure. The one or more evacuation routes can be conveyed to the individuals in the structure through one or more spoken audible evacuation messages. The evacuation system can also contact an emergency response center in response to the evacuation condition.

Figure 1:
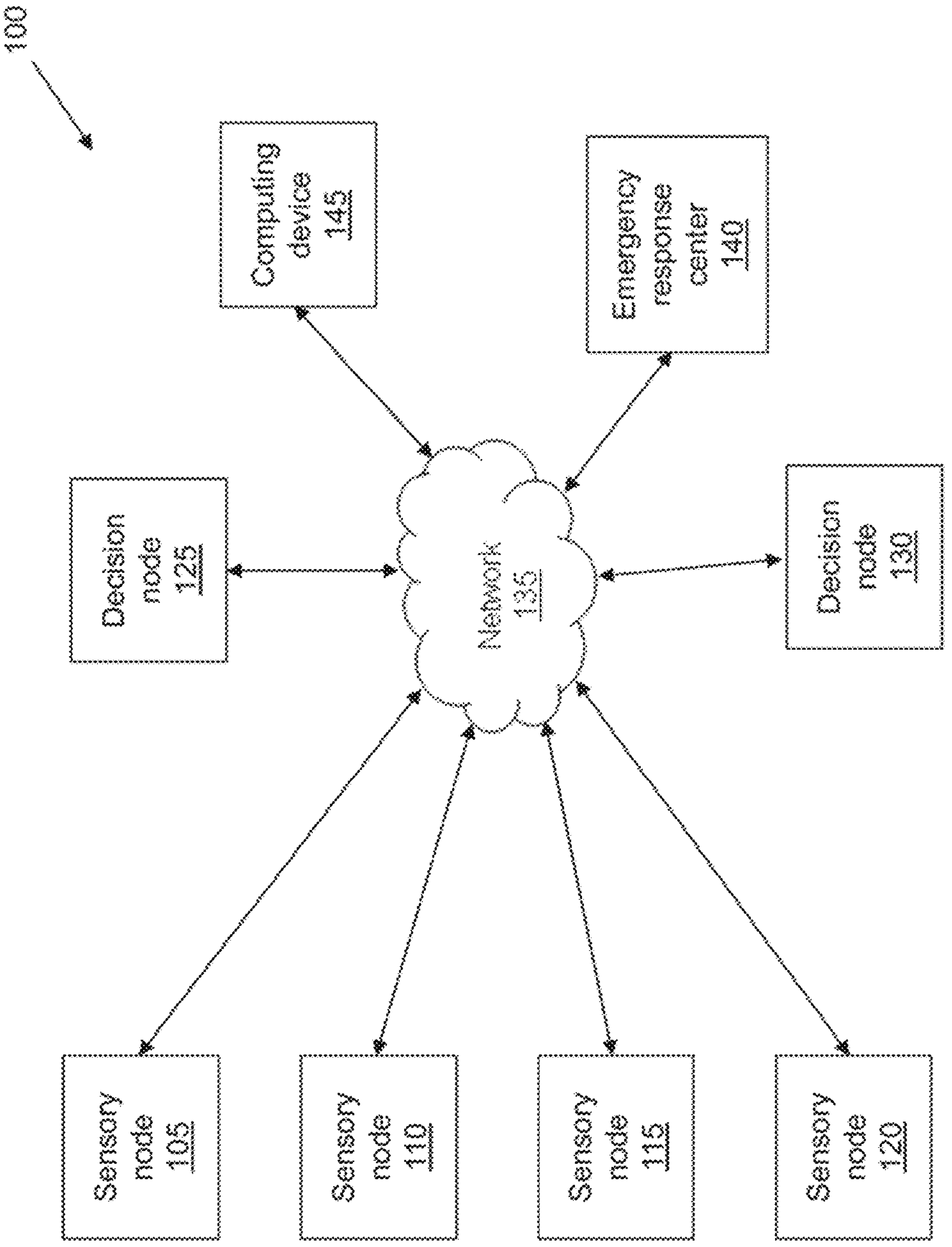
FIG. 1 is a block diagram illustrating an evacuation system in accordance with an illustrative embodiment.

FIG. 1 is a block diagram of an evacuation system 100 in accordance with an illustrative embodiment. In alternative embodiments, evacuation system 100 may include additional, fewer, and/or different components. Evacuation system 100 includes a sensory node 105, a sensory node 110, a sensory node 115, and a sensory node 120. In alternative embodiments, additional or fewer sensory nodes may be included. Evacuation system 100 also includes a decision node 125 and a decision node 130. Alternatively, additional or fewer decision nodes may be included.

In an illustrative embodiment, sensory nodes 105, 110, 115, and 120 can be configured to detect an evacuation condition. The evacuation condition can be a fire, which may be detected by the presence of smoke and/or excessive heat. The evacuation condition may also be an unacceptable level of a toxic gas such as carbon monoxide, nitrogen dioxide, etc. Sensory nodes 105, 110, 115, and 120 can be distributed throughout a structure. The structure can be a home, an office building, a commercial space, a store, a factory, or any other building or structure. As an example, a single story office building can have one or more sensory nodes in each office, each bathroom, each common area, etc. An illustrative sensory node is described in more detail with reference to FIG. 2.

Sensory nodes 105, 110, 115, and 120 can also be configured to detect and/or monitor occupancy such that evacuation system 100 can determine one or more optimal evacuation routes. For example, sensory node 105 may be placed in a conference room of a hotel. Using occupancy detection, sensory node 105 can know that there are approximately 80 individuals in the conference room at the time of an evacuation condition. Evacuation system 100 can use this occupancy information (i.e., the number of individuals and/or the location of the individuals) to determine the evacuation route(s). For example, evacuation system 100 may attempt to determine at least two safe evacuation routes from the conference room to avoid congestion that may occur if only a single evacuation route is designated. Occupancy detection and monitoring are described in more detail with reference to FIG. 2.

Decision nodes 125 and 130 can be configured to determine one or more evacuation routes upon detection of an evacuation condition. Decision nodes 125 and 130 can determine the one or more evacuation routes based on occupancy information such as a present occupancy or an occupancy pattern of a given area, the type of evacuation condition, the magnitude of the evacuation condition, the location(s) at which the evacuation condition is detected, the layout of the structure, etc. The occupancy pattern can be learned over time as the nodes monitor areas during quiescent conditions. Upon determination of the one or more evacuation routes, decision nodes 125 and 130 and/or sensory nodes 105, 110, 115, and 120 can convey the evacuation route(s) to the individuals in the structure. In an illustrative embodiment, the evacuation route(s) can be conveyed as audible voice evacuation messages through speakers of decision nodes 125 and 130 and/or sensory nodes 105, 110, 115, and 120. Alternatively, the evacuation route(s) can be conveyed by any other method. An illustrative decision node is described in more detail with reference to FIG. 3.

Sensory nodes 105, 110, 115, and 120 can communicate with decision nodes 125 and 130 through a network 135. Network 135 can include a short-range communication network such as a Bluetooth network, a Zigbee network, etc. Network 135 can also include a local area network (LAN), a wide area network (WAN), a telecommunications network, the Internet, a public switched telephone network (PSTN), and/or any other type of communication network known to those of skill in the art. Network 135 can be a distributed intelligent network such that evacuation system 100 can make decisions based on sensory input from any nodes in the population of nodes. In an illustrative embodiment, decision nodes 125 and 130 can communicate with sensory nodes 105, 110, 115, and 120 through a short-range communication network. Decision nodes 125 and 130 can also communicate with an emergency response center 140 through a telecommunications network, the Internet, a PSTN, etc. As such, in the event of an evacuation condition, emergency response center 140 can be automatically notified. Emergency response center 140 can be a 911 call center, a fire department, a police department, etc.

In the event of an evacuation condition, a sensory node that detected the evacuation condition can provide an indication of the evacuation condition to decision node 125 and/or decision node 130. The indication can include an identification and/or location of the sensory node, a type of the evacuation condition, and/or a magnitude of the evacuation condition. The magnitude of the evacuation condition can include an amount of smoke generated by a fire, an amount of heat generated by a fire, an amount of toxic gas in the air, etc. The indication of the evacuation condition can be used by decision node 125 and/or decision node 130 to determine evacuation routes. Determination of an evacuation route is described in more detail with reference to FIG. 4.

In an illustrative embodiment, sensory nodes 105, 110, 115, and 120 can also periodically provide status information to decision node 125 and/or decision node 130. The status information can include an identification of the sensory node, location information corresponding to the sensory node, information regarding battery life, and/or information regarding whether the sensory node is functioning properly. As such, decision nodes 125 and 130 can be used as a diagnostic tool to alert a system administrator or other user of any problems with sensory nodes 105, 110, 115, and 120. Decision nodes 125 and 130 can also communicate status information to one another for diagnostic purposes. The system administrator can also be alerted if any of the nodes of evacuation system 100 fail to timely provide status information according to a periodic schedule. In one embodiment, a detected failure or problem within evacuation system 100 can be communicated to the system administrator or other user via a text message or an e-mail.

In one embodiment, network 135 can include a redundant (or self-healing) mesh network centered around sensory nodes 105, 110, 115, and 120 and decision nodes 125 and 130. As such, sensory nodes 105, 110, 115, and 120 can communicate directly with decision nodes 125 and 130, or indirectly through other sensory nodes. As an example, sensory node 105 can provide status information directly to decision node 125. Alternatively, sensory node 105 can provide the status information to sensory node 115, sensory node 115 can provide the status information (relative to sensory node 105) to sensory node 120, and sensory node 120 can provide the status information (relative to sensory node 105) to decision node 125. The redundant mesh network can be dynamic such that communication routes can be determined on the fly in the event of a malfunctioning node. As such, in the example above, if sensory node 120 is down, sensory node 115 can automatically provide the status information (relative to sensory node 105) directly to decision node 125 or to sensory node 110 for provision to decision node 125. Similarly, if decision node 125 is down, sensory nodes 105, 110, 115, and 120 can be configured to convey status information directly or indirectly to decision node 130. The redundant mesh network can also be static such that communication routes are predetermined in the event of one or more malfunctioning nodes. Network 135 can receive/transmit messages over a large range as compared to the actual wireless range of individual nodes. Network 135 can also receive/transmit messages through various wireless obstacles by utilizing the mesh network capability of evacuation system 100. As an example, a message destined from an origin of node A to a distant destination of node Z (i.e., where node A and node Z are not in direct range of one another) may use any of the nodes between node A and node Z to convey the information. In one embodiment, the mesh network can operate within the 2.4 GHz range. Alternatively, any other range(s) may be used.

In an illustrative embodiment, each of sensory nodes 105, 110, 115, and 120 and/or each of decision nodes 125 and 130 can know its location. The location can be global positioning system (GPS) coordinates. In one embodiment, a computing device 145 can be used to upload the location to sensory nodes 105, 110, 115, and 120 and/or decision nodes 125 and 130. Computing device 145 can be a portable GPS system, a cellular device, a laptop computer, or any other type of communication device configured to convey the location. As an example, computing device 145 can be a GPS-enabled laptop computer. During setup and installation of evacuation system 100, a technician can place the GPS-enabled laptop computer proximate to sensory node 105. The GPS-enabled laptop computer can determine its current GPS coordinates, and the GPS coordinates can be uploaded to sensory node 105. The GPS coordinates can be uploaded to sensory node 105 wirelessly through network 135 or through a wired connection. Alternatively, the GPS coordinates can be manually entered through a user interface of sensory node 105. The GPS coordinates can similarly be uploaded to sensory nodes 110, 115, and 120 and decision nodes 125 and 130. In one embodiment, sensory nodes 105, 110, 115, and 120 and/or decision nodes 125 and 130 may be GPS-enabled for determining their respective locations. In one embodiment, each node can have a unique identification number or tag, which may be programmed during the manufacturing of the node. The identification can be used to match the GPS coordinates to the node during installation. Computing device 145 can use the identification information to obtain a one-to-one connection with the node to correctly program the GPS coordinates over network 135. In an alternative embodiment, GPS coordinates may not be used, and the location can be in terms of position with a particular structure. For example, sensory node 105 may be located in room five on the third floor of a hotel, and this information can be the location information for sensory node 105. Regardless of how the locations are represented, evacuation system 100 can determine the evacuation route(s) based at least in part on the locations and a known layout of the structure.

In one embodiment, a zeroing and calibration method may be employed to improve the accuracy of the indoor GPS positioning information programmed into the nodes during installation. Inaccuracies in GPS coordinates can occur due to changes in the atmosphere, signal delay, the number of viewable satellites, etc., and the expected accuracy of GPS is usually about 6 meters. To calibrate the nodes and improve location accuracy, a relative coordinated distance between nodes can be recorded as opposed to a direct GPS coordinate. Further improvements can be made by averaging multiple GPS location coordinates at each perspective node over a given period (i.e., 5 minutes, etc.) during evacuation system 100 configuration. At least one node can be designated as a zeroing coordinate location. All other measurements can be made with respect to the zeroing coordinate location. In one embodiment, the accuracy of GPS coordinates can further be improved by using an enhanced GPS location band such as the military P(Y) GPS location band. Alternatively, any other GPS location band may be used.

Figure 2:
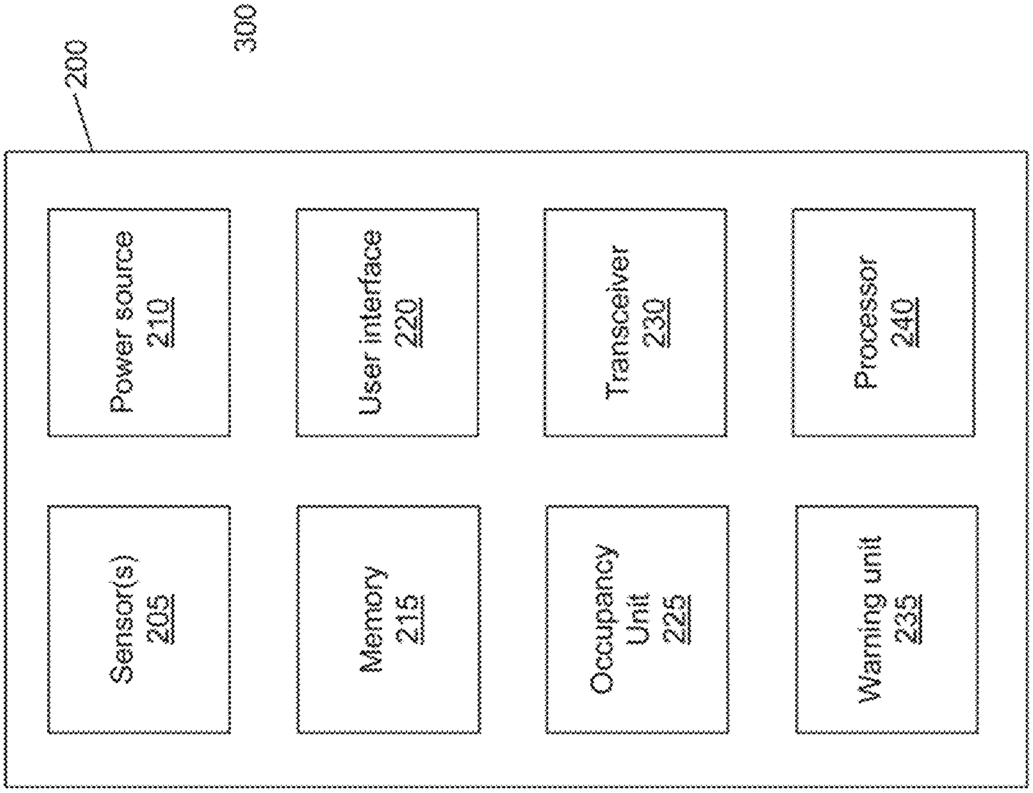
FIG. 2 is a block diagram illustrating a sensory node in accordance with an illustrative embodiment.

FIG. 2 is a block diagram illustrating a sensory node 200 in accordance with an illustrative embodiment. In alternative embodiments, sensory node 200 may include additional, fewer, and/or different components. Sensory node 200 includes sensor(s) 205, a power source 210, a memory 215, a user interface 220, an occupancy unit 225, a transceiver 230, a warning unit 235, and a processor 240. Sensor(s) 205 can include a smoke detector, a heat sensor, a carbon monoxide sensor, a nitrogen dioxide sensor, and/or any other type of hazardous condition sensor known to those of skill in the art. In an illustrative embodiment, power source 210 can be a battery. Sensory node 200 can also be hard-wired to the structure such that power is received from the power supply of the structure (i.e., utility grid, generator, solar cell, fuel cell, etc.). In such an embodiment, power source 210 can also include a battery for backup during power outages.

Memory 215 can be configured to store identification information corresponding to sensory node 200. The identification information can be any indication through which other sensory nodes and decision nodes are able to identify sensory node 200. Memory 215 can also be used to store location information corresponding to sensory node 200. The location information can include global positioning system (GPS) coordinates, position within a structure, or any other information which can be used by other sensory nodes and/or decision nodes to determine the location of sensory node 200. In one embodiment, the location information may be used as the identification information. The location information can be received from computing device 145 described with reference to FIG. 1, or from any other source. Memory 215 can further be used to store routing information for a mesh network in which sensory node 200 is located such that sensory node 200 is able to forward information to appropriate nodes during normal operation and in the event of one or more malfunctioning nodes. Memory 215 can also be used to store occupancy information and/or one or more evacuation messages to be conveyed in the event of an evacuation condition. Memory 215 can further be used for storing adaptive occupancy pattern recognition algorithms and for storing compiled occupancy patterns.

User interface 220 can be used by a system administrator or other user to program and/or test sensory node 200. User interface 220 can include one or more controls, a liquid crystal display (LCD) or other display for conveying information, one or more speakers for conveying information, etc. In one embodiment, a user can utilize user interface 220 to record an evacuation message to be played back in the event of an evacuation condition. As an example, sensory node 200 can be located in a bedroom of a small child. A parent of the child can record an evacuation message for the child in a calm, soothing voice such that the child does not panic in the event of an evacuation condition. An example evacuation message can be "wake up Kristin, there is a fire, go out the back door and meet us in the back yard as we have practiced." Different evacuation messages may be recorded for different evacuation conditions. Different evacuation messages may also be recorded based on factors such as the location at which the evacuation condition is detected. As an example, if a fire is detected by any of sensory nodes one through six, a first pre-recorded evacuation message can be played (i.e., exit through the back door), and if the fire is detected at any of nodes seven through twelve, a second pre-recorded evacuation message can be played (i.e., exit through the front door). User interface 220 can also be used to upload location information to sensory node 200, to test sensory node 200 to ensure that sensory node 200 is functional, to adjust a volume level of sensory node 200, to silence sensory node 200, etc. User interface 220 can also be used to alert a user of a problem with sensory node 200 such as low battery power or a malfunction. In one embodiment, user interface 220 can be used to record a personalized message in the event of low battery power, battery malfunction, or other problem. For example, if the device is located within a home structure, the pre-recorded message may indicate that "the evacuation detector in the hallway has low battery power, please change." User interface 220 can further include a button such that a user can report an evacuation condition and activate the evacuation system.

Occupancy unit 225 can be used to detect and/or monitor occupancy of a structure. As an example, occupancy unit 225 can detect whether one or more individuals are in a given room or area of a structure. A decision node can use this occupancy information to determine an appropriate evacuation route or routes. As an example, if it is known that two individuals are in a given room, a single evacuation route can be used. However, if three hundred individuals are in the room, multiple evacuation routes may be provided to prevent congestion. Occupancy unit 225 can also be used to monitor occupancy patterns. As an example, occupancy unit 225 can determine that there are generally numerous individuals in a given room or location between the hours of 8:00 am and 6:00 pm on Mondays through Fridays, and that there are few or no individuals present at other times. A decision node can use this information to determine appropriate evacuation route(s). Information determined by occupancy unit 225 can also be used to help emergency responders in responding to the evacuation condition. For example, it may be known that one individual is in a given room of the structure. The emergency responders can use this occupancy information to focus their efforts on getting the individual out of the room. The occupancy information can be provided to an emergency response center along with a location and type of the evacuation condition. Occupancy unit 225 can also be used to help sort rescue priorities based at least in part on the occupancy information while emergency responders are on route to the structure.

Occupancy unit 225 can detect/monitor the occupancy using one or more motion detectors to detect movement. Occupancy unit 225 can also use a video or still camera and video/image analysis to determine the occupancy. Occupancy unit 225 can also use respiration detection by detecting carbon dioxide gas emitted as a result of breathing. An example high sensitivity carbon dioxide detector for use in respiration detection can be the MG-811 CO2 sensor manufactured by Henan Hanwei Electronics Co., Ltd. based in Zhengzhou, China. Alternatively, any other high sensitivity carbon dioxide sensor may be used. Occupancy unit 225 can also be configured to detect methane, or any other gas which may be associated with human presence.

Occupancy unit 225 can also use infrared sensors to detect heat emitted by individuals. In one embodiment, a plurality of infrared sensors can be used to provide multidirectional monitoring. Alternatively, a single infrared sensor can be used to scan an entire area. The infrared sensor(s) can be combined with a thermal imaging unit to identify thermal patterns and to determine whether detected occupants are human, feline, canine, rodent, etc. The infrared sensors can also be used to determine if occupants are moving or still, to track the direction of occupant traffic, to track the speed of occupant traffic, to track the volume of occupant traffic, etc. This information can be used to alert emergency responders to a panic situation, or to a large captive body of individuals. Activities occurring prior to an evacuation condition can be sensed by the infrared sensors and recorded by the evacuation system. As such, suspicious behavioral movements occurring prior to an evacuation condition can be sensed and recorded. For example, if the evacuation condition was maliciously caused, the recorded information from the infrared sensors can be used to determine how quickly the area was vacated immediately prior to the evacuation condition. Infrared sensor based occupancy detection is described in more detail in an article titled "Development of Infrared Human Sensor" in the Matsushita Electric Works (MEW) Sustainability Report 2004, the entire disclosure of which is incorporated herein by reference.

Occupancy unit 225 can also use audio detection to identify noises associated with occupants such as snoring, respiration, heartbeat, voices, etc. The audio detection can be implemented using a high sensitivity microphone which is capable of detecting a heartbeat, respiration, etc. from across a room. Any high sensitivity microphone known to those of skill in the art may be used. Upon detection of a sound, occupancy unit 225 can utilize pattern recognition to identify the sound as speech, a heartbeat, respiration, snoring, etc. Occupancy unit 225 can similarly utilize voice recognition and/or pitch tone recognition to distinguish human and non-human occupants and/or to distinguish between different human occupants. As such, emergency responders can be informed whether an occupant is a baby, a small child, an adult, a dog, etc. Occupancy unit 225 can also detect occupants using scent detection. An example sensor for detecting scent is described in an article by Jacqueline Mitchell titled "Picking Up the Scent" and appearing in the August 2008 Tufts Journal, the entire disclosure of which is incorporated herein by reference.

In one embodiment, occupancy unit 225 can also be implemented as a portable, handheld occupancy unit. The portable occupancy unit can be configured to detect human presence using audible sound detection, infrared detection, respiration detection, motion detection, scent detection, etc. as described above. Firefighters, paramedics, police, etc. can utilize the portable occupancy unit to determine whether any human is present in a room with limited or no visibility. As such, the emergency responders can quickly scan rooms and other areas without expending the time to fully enter the room and perform an exhaustive manual search. The portable occupancy unit can include one or more sensors for detecting human presence. The portable occupancy unit can also include a processor for processing detected signals as described above with reference to occupancy unit 225, a memory for data storage, a user interface for receiving user inputs, an output for conveying whether human presence is detected, etc.

In an alternative embodiment, sensory node 200 (and/or decision node 300 described with reference to FIG. 3) can be configured to broadcast occupancy information. In such an embodiment, emergency response personnel can be equipped with a portable receiver configured to receive the broadcasted occupancy information such that the responder knows where any humans are located with the structure. The occupancy information can also be broadcast to any other type of receiver. The occupancy information can be used to help rescue individuals in the event of a fire or other evacuation condition. The occupancy information can also be used in the event of a kidnapping or hostage situation to identify the number of victims involved, the number of perpetrators involved, the locations of the victims and/or perpetrators, etc.

Transceiver 230 can include a transmitter for transmitting information and/or a receiver for receiving information. As an example, transceiver 230 of sensory node 200 can receive status information, occupancy information, evacuation condition information, etc. from a first sensory node and forward the information to a second sensory node or to a decision node. Transceiver 230 can also be used to transmit information corresponding to sensory node 200 to another sensory node or a decision node. For example, transceiver 230 can periodically transmit occupancy information to a decision node such that the decision node has the occupancy information in the event of an evacuation condition. Alternatively, transceiver 230 can be used to transmit the occupancy information to the decision node along with an indication of the evacuation condition. Transceiver 230 can also be used to receive instructions regarding appropriate evacuation routes and/or the evacuation routes from a decision node. Alternatively, the evacuation routes can be stored in memory 215 and transceiver 230 may only receive an indication of which evacuation route to convey.

Warning unit 235 can include a speaker and/or a display for conveying an evacuation route or routes. The speaker can be used to play an audible voice evacuation message. The evacuation message can be conveyed in one or multiple languages, depending on the embodiment. If multiple evacuation routes are used based on occupancy information or the fact that numerous safe evacuation routes exist, the evacuation message can include the multiple evacuation routes in the alternative. For example, the evacuation message may state "please exit to the left through stairwell A, or to the right through stairwell B." The display of warning unit 235 can be used to convey the evacuation message in textual form for deaf individuals or individuals with poor hearing. Warning unit 235 can further include one or more lights to indicate that an evacuation condition has been detected and/or to illuminate at least a portion of an evacuation route. In the event of an evacuation condition, warning unit 235 can be configured to repeat the evacuation message(s) until a stop evacuation message instruction is received from a decision node, until the evacuation system is reset or muted by a system administrator or other user, or until sensory node 200 malfunctions due to excessive heat, etc. Warning unit 235 can also be used to convey a status message such as "smoke detected in room thirty-five on the third floor." The status message can be played one or more times in between the evacuation message. In an alternative embodiment, sensory node 200 may not include warning unit 235, and the evacuation route(s) may be conveyed only by decision nodes. The evacuation condition may be detected by sensory node 200, or by any other node in direct or indirect communication with sensory node 200.

Processor 240 can be operatively coupled to each of the components of sensory node 200, and can be configured to control interaction between the components. For example, if an evacuation condition is detected by sensor(s) 205, processor 240 can cause transceiver 230 to transmit an indication of the evacuation condition to a decision node. In response, transceiver 230 can receive an instruction from the decision node regarding an appropriate evacuation message to convey. Processor 240 can interpret the instruction, obtain the appropriate evacuation message from memory 215, and cause warning unit 235 to convey the obtained evacuation message. Processor 240 can also receive inputs from user interface 220 and take appropriate action. Processor 240 can further be used to process, store, and/or transmit occupancy information obtained through occupancy unit 225. Processor 240 can further be coupled to power source 210 and used to detect and indicate a power failure or low battery condition. In one embodiment, processor 240 can also receive manually generated alarm inputs from a user through user interface 220. As an example, if a fire is accidently started in a room of a structure, a user may press an alarm activation button on user interface 220, thereby signaling an evacuation condition and activating warning unit 235. In such an embodiment, in the case of accidental alarm activation, sensory node 200 may inform the user that he/she can press the alarm activation button a second time to disable the alarm. After a predetermined period of time (i.e., 5 seconds, 10 seconds, 30 seconds, etc.), the evacuation condition may be conveyed to other nodes and/or an emergency response center through the network.

Figure 3:
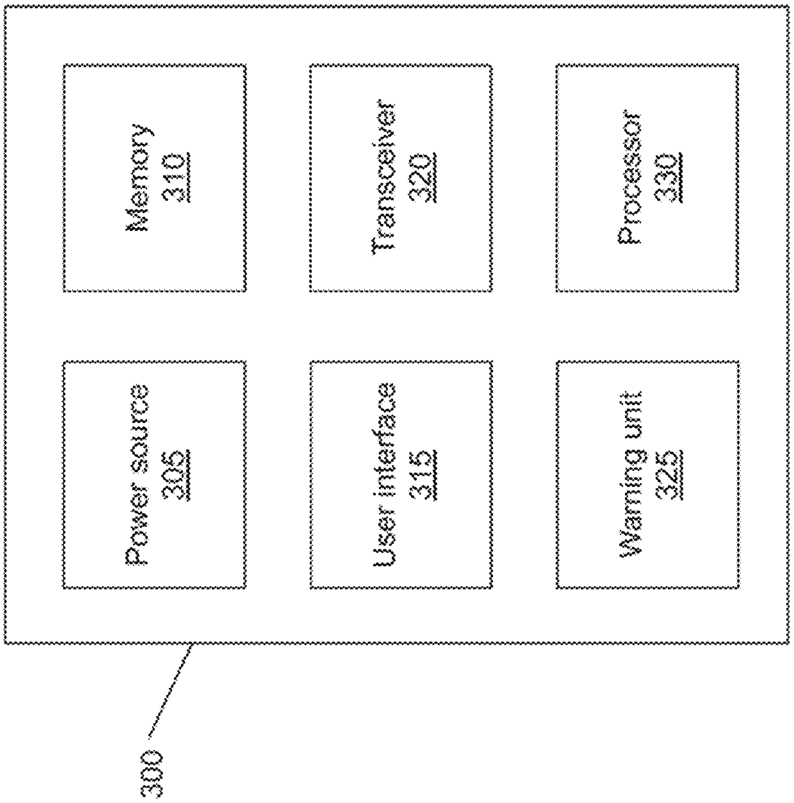
FIG. 3 is a block diagram illustrating a decision node in accordance with an illustrative embodiment.

FIG. 3 is a block diagram illustrating a decision node 300 in accordance with an exemplary embodiment. In alternative embodiments, decision node 300 may include additional, fewer, and/or different components. Decision node 300 includes a power source 305, a memory 310, a user interface 315, a transceiver 320, a warning unit 325, and a processor 330. In one embodiment, decision node 300 can also include sensor(s) and/or an occupancy unit as described with reference to sensory unit 200 of FIG. 2. In an illustrative embodiment, power source 305 can be the same or similar to power source 210 described with reference to FIG. 2. Similarly, user interface 315 can be the same or similar to user interface 220 described with reference to FIG. 2, and warning unit 325 can be the same or similar to warning unit 235 described with reference to FIG. 2.

Memory 310 can be configured to store a layout of the structure(s) in which the evacuation system is located, information regarding the locations of sensory nodes and other decision nodes, information regarding how to contact an emergency response center, occupancy information, occupancy detection and monitoring algorithms, and/or an algorithm for determining an appropriate evacuation route. Transceiver 320, which can be similar to transceiver 230 described with reference to FIG. 2, can be configured to receive information from sensory nodes and other decision nodes and to transmit evacuation routes to sensory nodes and/or other decision nodes. Processor 330 can be operatively coupled to each of the components of decision node 300, and can be configured to control interaction between the components.

In one embodiment, decision node 300 can be an exit sign including an EXIT display in addition to the components described with reference to FIG. 3. As such, decision node 300 can be located proximate an exit of a structure, and warning unit 325 can direct individuals toward or away from the exit depending on the identified evacuation route(s). In an alternative embodiment, all nodes of the evacuation system may be identical such that there is not a distinction between sensory nodes and decision nodes. In such an embodiment, all of the nodes can have sensor(s), an occupancy unit, decision-making capability, etc.

Figure 4:
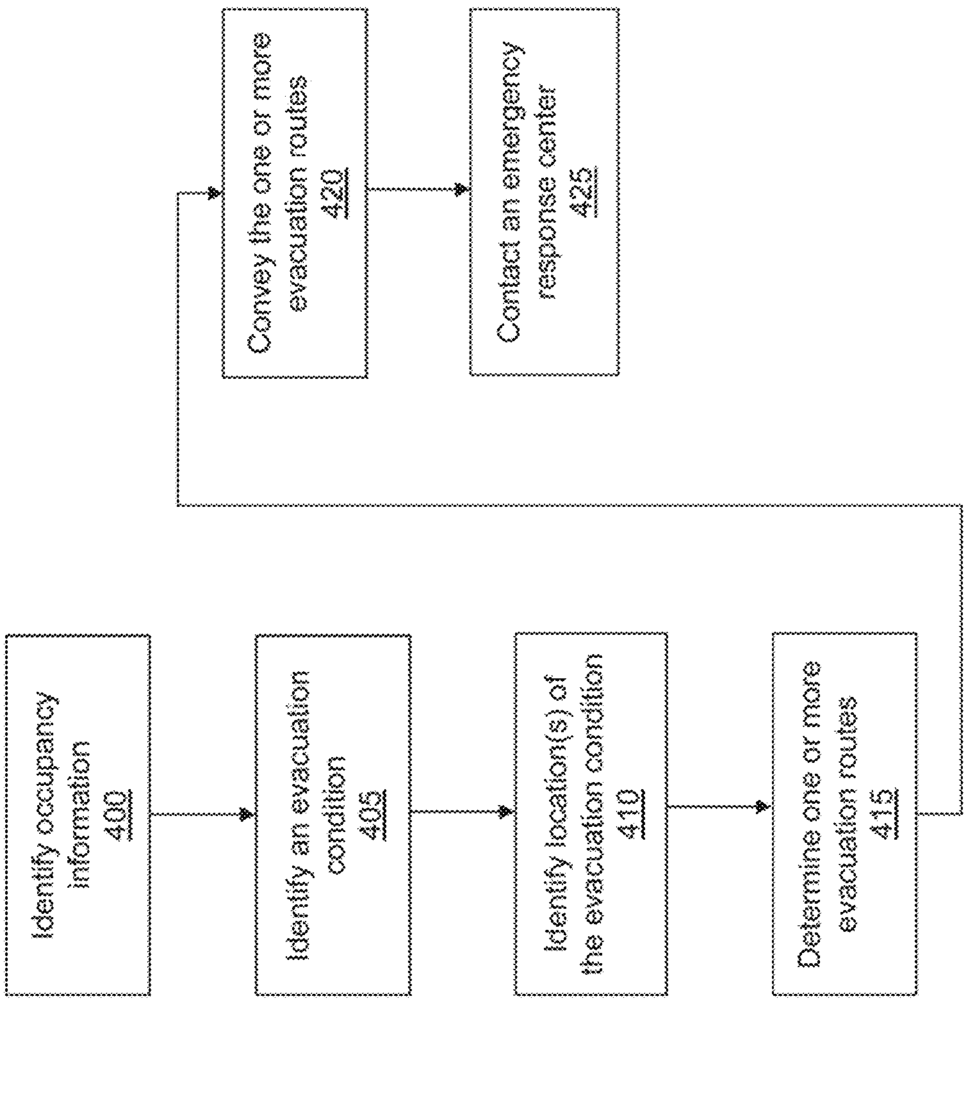
FIG. 4 is a flow diagram illustrating operations performed by an evacuation system in accordance with an illustrative embodiment.

FIG. 4 is a flow diagram illustrating operations performed by an evacuation system in accordance with an illustrative embodiment. In alternative embodiments, additional, fewer, and/or different operations may be performed. Further, the use of a flow diagram is not meant to be limiting with respect to the order of operations performed. Any of the operations described with reference to FIG. 4 can be performed by one or more sensory nodes and/or by one or more decision nodes. In an operation 400, occupancy information is identified. The occupancy information can include information regarding a number of individuals present at a given location at a given time (i.e., current information). The occupancy information can also include occupancy patterns based on long term monitoring of the location. The occupancy information can be identified using occupancy unit 225 described with reference to FIG. 2 and/or by any other methods known to those of skill in the art. The occupancy information can be specific to a given node, and can be determined by sensory nodes and/or decision nodes.

In an operation 405, an evacuation condition is identified. The evacuation condition can be identified by a sensor associated with a sensory node and/or a decision node. The evacuation condition can result from the detection of smoke, heat, toxic gas, etc. A decision node can receive an indication of the evacuation condition from a sensory node or other decision node. Alternatively, the decision node may detect the evacuation condition using one or more sensors. The indication of the evacuation condition can identify the type of evacuation condition detected and/or a magnitude or severity of the evacuation condition. As an example, the indication of the evacuation condition may indicate that a high concentration of carbon monoxide gas was detected.

In an operation 410, location(s) of the evacuation condition are identified. The location(s) can be identified based on the identity of the node(s) which detected the evacuation condition. For example, the evacuation condition may be detected by node A. Node A can transmit an indication of the evacuation condition to a decision node B along with information identifying the transmitter as node A. Decision node B can know the coordinates or position of node A and use this information in determining an appropriate evacuation route. Alternatively, node A can transmit its location (i.e., coordinates or position) along with the indication of the evacuation condition.

In an operation 415, one or more evacuation routes are determined. In an illustrative embodiment, the one or more evacuation routes can be determined based at least in part on a layout of the structure, the occupancy information, the type of evacuation condition, the severity of the evacuation condition, and/or the location(s) of the evacuation condition. In an illustrative embodiment, a first decision node to receive an indication of the evacuation condition or to detect the evacuation condition can be used to determine the evacuation route(s). In such an embodiment, the first decision node to receive the indication can inform any other decision nodes that the first decision node is determining the evacuation route(s), and the other decision nodes can be configured to wait for the evacuation route(s) from the first decision node. Alternatively, multiple decision nodes can simultaneously determine the evacuation route(s) and each decision node can be configured to convey the evacuation route(s) to a subset of sensory nodes. Alternatively, multiple decision nodes can simultaneously determine the evacuation route(s) for redundancy in case any one of the decision nodes malfunctions due to the evacuation condition. In one embodiment, each decision node can be responsible for a predetermined portion of the structure and can be configured to determine evacuation route(s) for that predetermined portion or area. For example, a first decision node can be configured to determine evacuation route(s) for evacuating a first floor of the structure, a second decision node can be configured to determine evacuation route(s) for evacuating a second floor of the structure, and so on. In such an embodiment, the decision nodes can communicate with one another such that each of the evacuation route(s) is based at least in part on the other evacuation route(s).

As indicated above, the one or more evacuation routes can be determined based at least in part on the occupancy information. As an example, the occupancy information may indicate that approximately 50 people are located in a conference room in the east wing on the fifth floor of a structure and that 10 people are dispersed throughout the third floor of the structure. The east wing of the structure can include an east stairwell that is rated for supporting the evacuation of 100 people. If there are no other large groups of individuals to be directed through the east stairwell and the east stairwell is otherwise safe, the evacuation route can direct the 50 people toward the east stairwell, down the stairs to a first floor lobby, and out of the lobby through a front door of the structure. In order to prevent congestion on the east stairwell, the evacuation route can direct the 10 people from the third floor of the structure to evacuate through a west stairwell assuming that the west stairwell is otherwise safe and uncongested. As another example, the occupancy information can be used to designate multiple evacuation routes based on the number of people known to be in a given area and/or the number of people expected to be in a given area based on historical occupancy patterns.

The one or more evacuation routes can also be determined based at least in part on the type of evacuation condition. For example, in the event of a fire, all evacuation routes can utilize stairwells, doors, windows, etc. However, if a toxic gas such as nitrogen dioxide is detected, the evacuation routes may utilize one or more elevators in addition to stairwells, doors, windows, etc. For example, nitrogen dioxide may be detected on floors 80-100 of a building. In such a situation, elevators may be the best evacuation option for individuals located on floors 90-100 to evacuate. Individuals on floors 80-89 can be evacuated using a stairwell and/or elevators, and individuals on floors 2-79 can be evacuated via the stairwell. In an alternative embodiment, elevators may not be used as part of an evacuation route. In one embodiment, not all evacuation conditions may result in an entire evacuation of the structure. An evacuation condition that can be geographically contained may result in a partial evacuation of the structure. For example, nitrogen dioxide may be detected in a room on the ground floor with an open window, where the nitrogen dioxide is due to an idling vehicle proximate the window. The evacuation system may evacuate only the room in which the nitrogen dioxide was detected. As such, the type and/or severity of the evacuation condition can dictate not only the evacuation route, but also the area to be evacuated.

The one or more evacuation routes can also be determined based at least in part on the severity of the evacuation condition. As an example, heat may detected in the east stairwell and the west stairwell of a structure having only the two stairwells. The heat detected in the east stairwell may be 120 degrees Fahrenheit (F) and the heat detected in the west stairwell may be 250 degrees F. In such a situation, if no other options are available, the evacuation routes can utilize the east stairwell. The concentration of a detected toxic gas can similarly be used to determine the evacuation routes. The one or more evacuation routes can further be determined based at least in part on the location(s) of the evacuation condition. As an example, the evacuation condition can be identified by nodes located on floors 6 and 7 of a structure and near the north stairwell of the structure. As such, the evacuation route for individuals located on floors 2-5 can utilize the north stairwell of the structure, and the evacuation route for individuals located on floors 6 and higher can utilize a south stairwell of the structure.

In an operation 420, the one or more evacuation routes are conveyed. In an illustrative embodiment, the one or more evacuation routes can be conveyed by warning units of nodes such as warning unit 235 described with reference to FIG. 2 and warning unit 325 described with reference to FIG. 3. In an illustrative embodiment, each node can convey one or more designated evacuation routes, and each node may convey different evacuation route(s). Similarly, multiple nodes may all convey the same evacuation route(s). In an operation 425, an emergency response center is contacted. The evacuation system can automatically provide the emergency response center with occupancy information, a type of the evacuation condition, a severity of the evacuation condition, and/or the location(s) of the evacuation condition. As such, emergency responders can be dispatched immediately. The emergency responders can also use the information to prepare for the evacuation condition and respond effectively to the evacuation condition.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:

receiving, at a first node located within a structure, an indication of an evacuation condition associated with the structure;

determining, by the first node, a first evacuation route responsive to the indication of the evacuation condition, wherein determining the first evacuation route comprises using an occupancy pattern that has been learned over time by monitoring one or more areas during quiescent conditions; and determining, by the first node, a second evacuation route, wherein determining the second evacuation route comprises identifying a location along the first evacuation route and matching the location with an ingress of the section evacuation route; and wherein the second evacuation route considers changes in occupancy patterns along a path of the first evacuation route.

2. The method of claim 1, wherein the first evacuation route traverses a first portion of the structure and the second evacuation route traverses a second portion of the structure.

3. The method of claim 1, wherein the first evacuation route comprises a firstexit, wherein the second evacuation route comprises a second exit, and wherein the second exit is different from the first exit.

4. The method of claim 3, further comprising:

comparing, by the second node, occupancy information corresponding to the first exit with occupancy information corresponding to the second exit; and in response to comparing the occupancy information, choosing the second exit for the second evacuation route, wherein comparing the occupancy information indicates that the second exit is less crowded than the first exit.

5. The method of claim 4, wherein the occupancy information corresponding to the first and second exits comprises at least one of a number of occupants, a time of occupancy, a historical occupancy pattern, or a predicted occupancy.

6. The method of claim 1, further comprising:

determining, by at least one of the first node or a second node, a severity of the evacuation condition at varying locations within the structure;

comparing the severity of the evacuation condition proximate a first exit with the severity of the evacuation condition proximate a second exit; and in response to determining that the severity of the evacuation condition proximate the first exit is less than the severity of the evacuation condition proximate the second exit, determining the second evacuation route such that the second evacuation route leads to the first exit.

7. The method of claim 1, further comprising:

determining a first type of the evacuation condition within a portion of the structure corresponding to the first evacuation route;

determining a first mode of evacuation for the first evacuation route based on the first type of the evacuation condition;

determining a second type of the evacuation condition within a portion of the structure corresponding to the second evacuation route; and determining a second mode of evacuation for the second evacuation route based on the second type of the evacuation condition, wherein the second mode is different from the first mode.

8. The method of claim 1, further comprising:

conveying, by the first node, the first evacuation route to occupants within a first portion of the structure; and conveying, by a second node, the second evacuation route to the occupants within a second portion of the structure.

9. The method of claim 1, further comprising;

receiving, by a third node located within the structure, at least one of the first evacuation route or the second evacuation route; and determining, by the third node, a third evacuation route based upon the first evacuation route and the second evacuation route.

10. A system comprising:

a first node located within a structure, the first node comprising: a first memory; and a first processor operatively coupled to the first memory, the first memory comprising software instructions which, when executed by the first processor, cause the first node to:

receive an indication of an evacuation condition within the structure;

determine a first evacuation route responsive to the indication of the evacuation condition, wherein determining the first evacuation route comprises using an occupancy pattern that has been learned over time by monitoring one or more areas during quiescent conditions; and determine by the first node, a second evacuation route based on changes in occupancy patterns along the first evacuation route, the second evacuation route further determined by identifying a location along the first evacuation route and matching the location with an ingress of the section evacuation route.

11. The system of claim 10, wherein the first evacuation route traverses a first portion of the structure and the second evacuation route traverses a second portion of the structure, and wherein the second node matches a location along the first evacuation route with an ingress of the second evacuation route.

12. The system of claim 10, wherein the first evacuation route comprises a first exit, wherein the second evacuation route comprises a second exit, and wherein the second exit is different from the first exit.

13. The system of claim 12, wherein the second node compares occupancy information corresponding to the first exit with occupancy information corresponding to the second exit to determine that an area proximate the second exit is expected to be less crowded than an area proximate the first exit, and wherein upon determining that the area adjacent the second exit is expected to be less crowded, the second node chooses the second exit for the second evacuation route.

14. The system of claim 10, wherein at least one of the first node or a second node determines a severity of the evacuation condition at a plurality of locations within the structure, wherein the system compares the severity of the evacuation condition proximate a first exit with the severity of the evacuation condition proximate a second exit, and upon determining that the severity of the evacuation condition adjacent the first exit is greater than the severity of the evacuation condition adjacent the second exit, the second evacuation route is determined such that the second evacuation route leads to the second exit.

15. The system of claim 10, wherein the system determines a type of the evacuation condition, wherein in response to receiving the first evacuation route using a first mode of evacuating suitable for the type of the evacuation condition, the system further determines a second mode of evacuating suitable for the type of the evacuation condition in the second evacuation route, and wherein the second mode is different from the first mode.

16. The system of claim 10, wherein at least one of the first node or a second node transmits the indication of the evacuation condition to an emergency response center.

17. The system of claim 10, wherein at least one of the first node or a second node transmits one or more warning messages indicating the first evacuation route and the second evacuation route.

18. A non-transitory computer-readable media comprising computer-readable instructions stored thereon that when executed by a processor associated with a first node located within a structure cause the processor to:

receive an indication of an evacuation condition within the structure;

determine, by the first node, a first evacuation route responsive to the indication of the evacuation condition, wherein determining the first evacuation route comprises using an occupancy pattern that has been learned over time by monitoring one or more areas during quiescent conditions; and determine, by the first node, a second evacuation route wherein determining the second evacuation route comprises:

identifying a location along the first evacuation route, matching the location with an ingress of the second evacuation route; and considering changes in occupancy patterns along a path of the first evacuation route.

19. The non-transitory computer-readable media of claim 18, wherein in response to the first evacuation route traversing a first portion of the structure, the first node determines the second evacuation route to traverse a second portion of the structure such that an egress from the second portion of the structure leads to an ingress of the first portion of the structure.

20. The non-transitory computer-readable media of claim 18, wherein in response to the first evacuation route comprising a first exit, the first node determines the second evacuation route to lead to a second exit, and wherein the second exit is different from the first exit.

* * * * *